H. C. GUETSCHOFF.
ACCOUNT REGISTER.
APPLICATION FILED OCT. 1, 1909.

1,035,001.

Patented Aug. 6, 1912.
6 SHEETS—SHEET 6.

Inventor
Herman C. Guetschoff,

Witnesses
Frank Hough
W. Bagger

By Victor J. Evans
Attorney

UNITED STATES PATENT OFFICE.

HERMAN C. GUETSCHOFF, OF FRASER, MICHIGAN.

ACCOUNT-REGISTER.

1,035,001.  Specification of Letters Patent.  Patented Aug. 6, 1912.

Application filed October 1, 1909. Serial No. 520,452.

*To all whom it may concern:*

Be it known that I, HERMAN C. GUETSCHOFF, a citizen of the United States, residing at Fraser, in the county of Macomb and State of Michigan, have invented new and useful Improvements in Account-Registers, of which the following is a specification.

This invention relates to an improved device for facilitating the keeping of accounts and which may be appropriately designated as an account register.

The primary object of the invention is to enable credit accounts to be accurately and systematically kept without resorting to involved bookkeeping systems such as are now customarily employed.

A further object of the invention is to provide a simple and improved device whereby accounts may be conveniently and accurately kept merely by the use of sales slips which are issued in duplicate, one of which is delivered to the customer while the other is retained by the merchant; the improved device of the present invention constituting a filing cabinet wherein the retained sales slip may be conveniently stored.

A still further object of the invention is to provide a filing cabinet of the character described which shall be so arranged that all credit transactions may be easily recorded and any error be readily detected.

Still further objects of the invention are to make records of the number of credit or charge sales made during the day; of who made them; and how many customers each clerk waited on; at the same time adding and showing the total number of sales; thus giving the daily record of each clerk and enabling the total amount of the account of each customer to be readily ascertained at any time.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited but that changes, alterations and modifications within the scope of the invention may be resorted to when desired.

Figure 1:
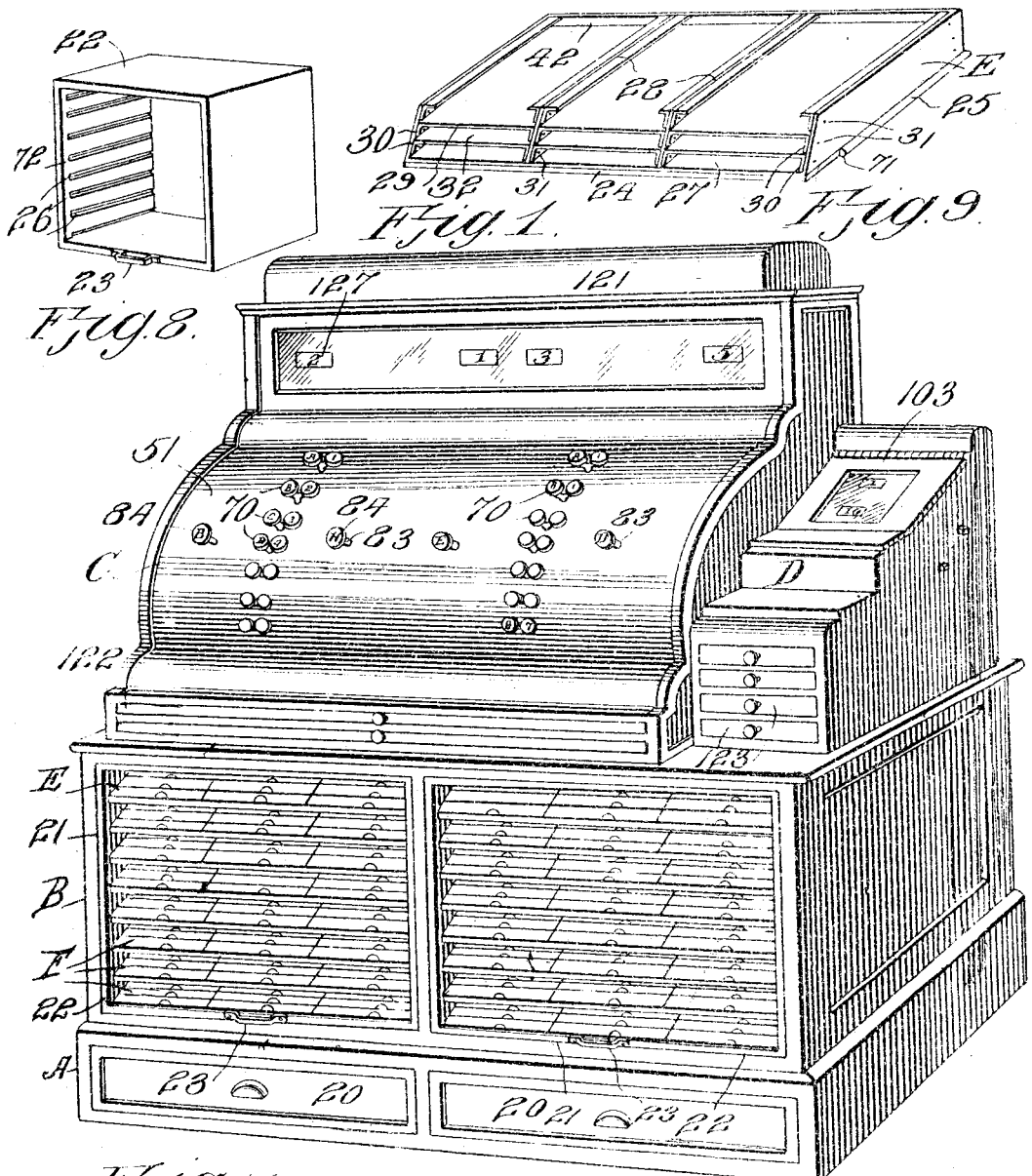
Figure 2:
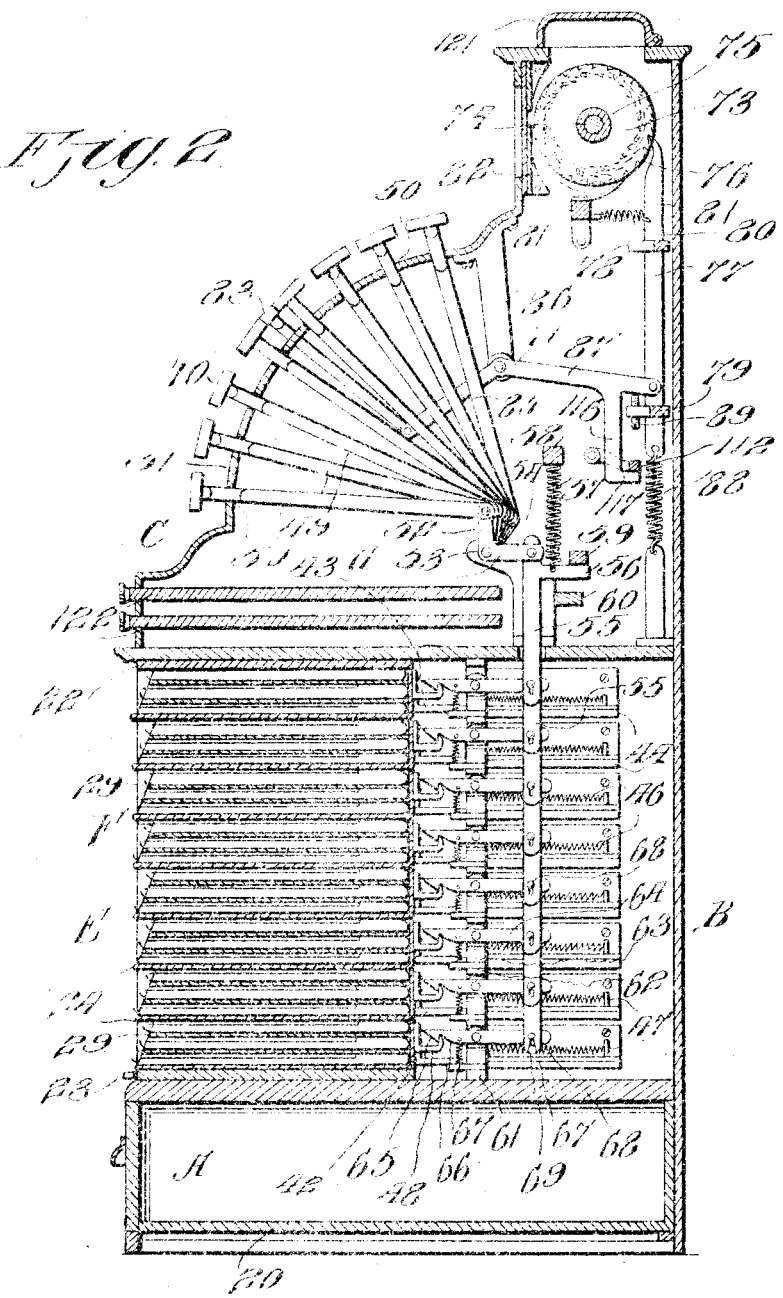
Figure 3:
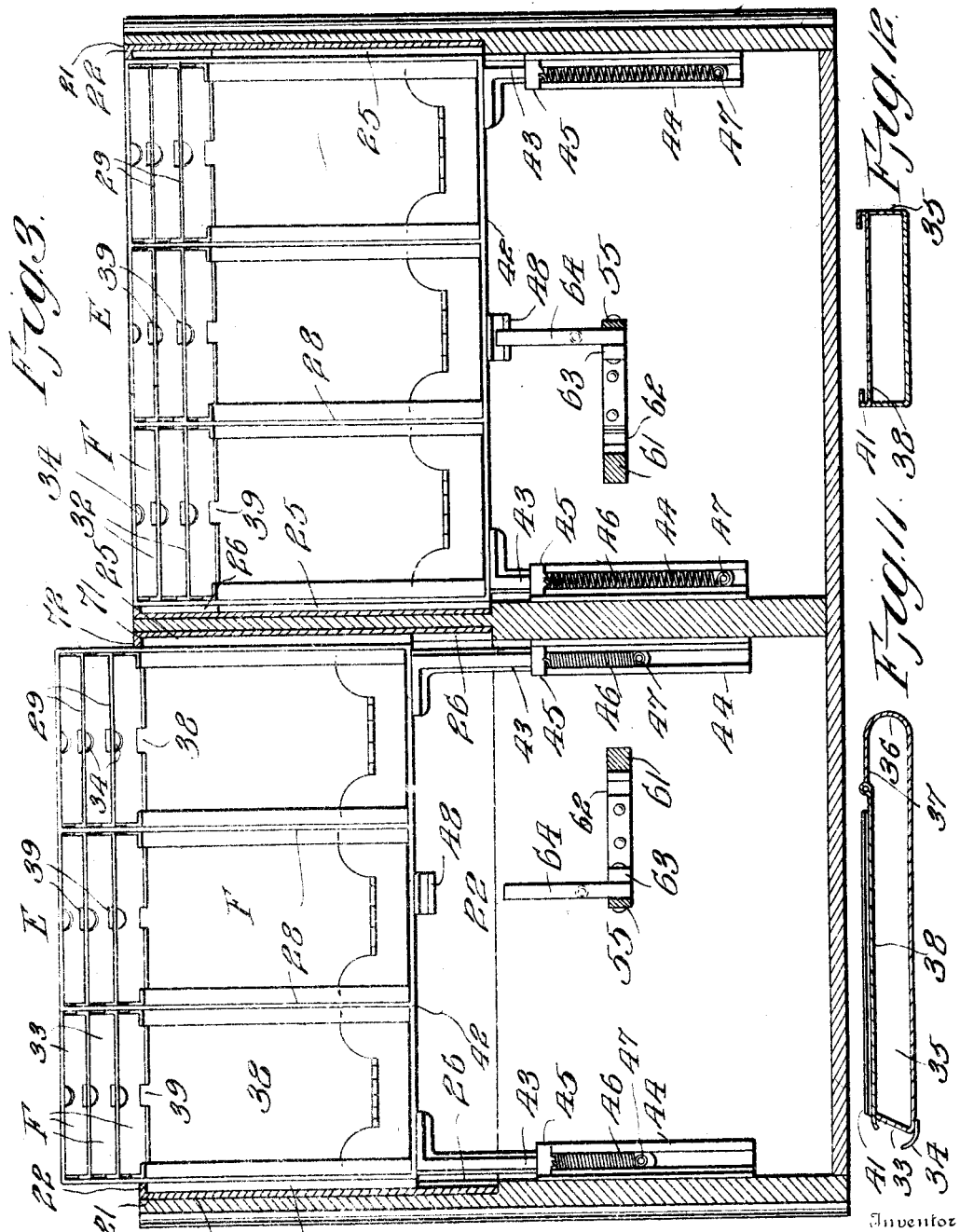
Figure 4:
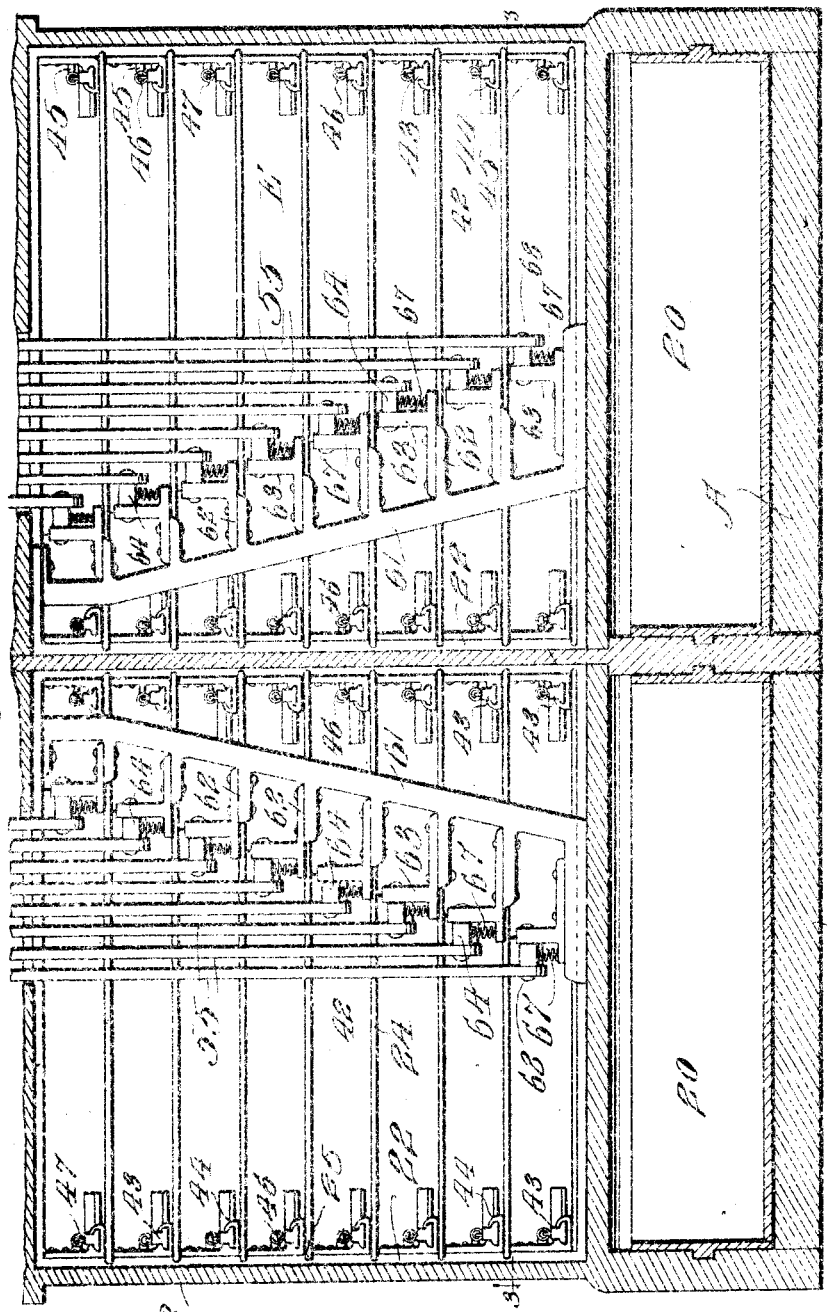
Figure 5:
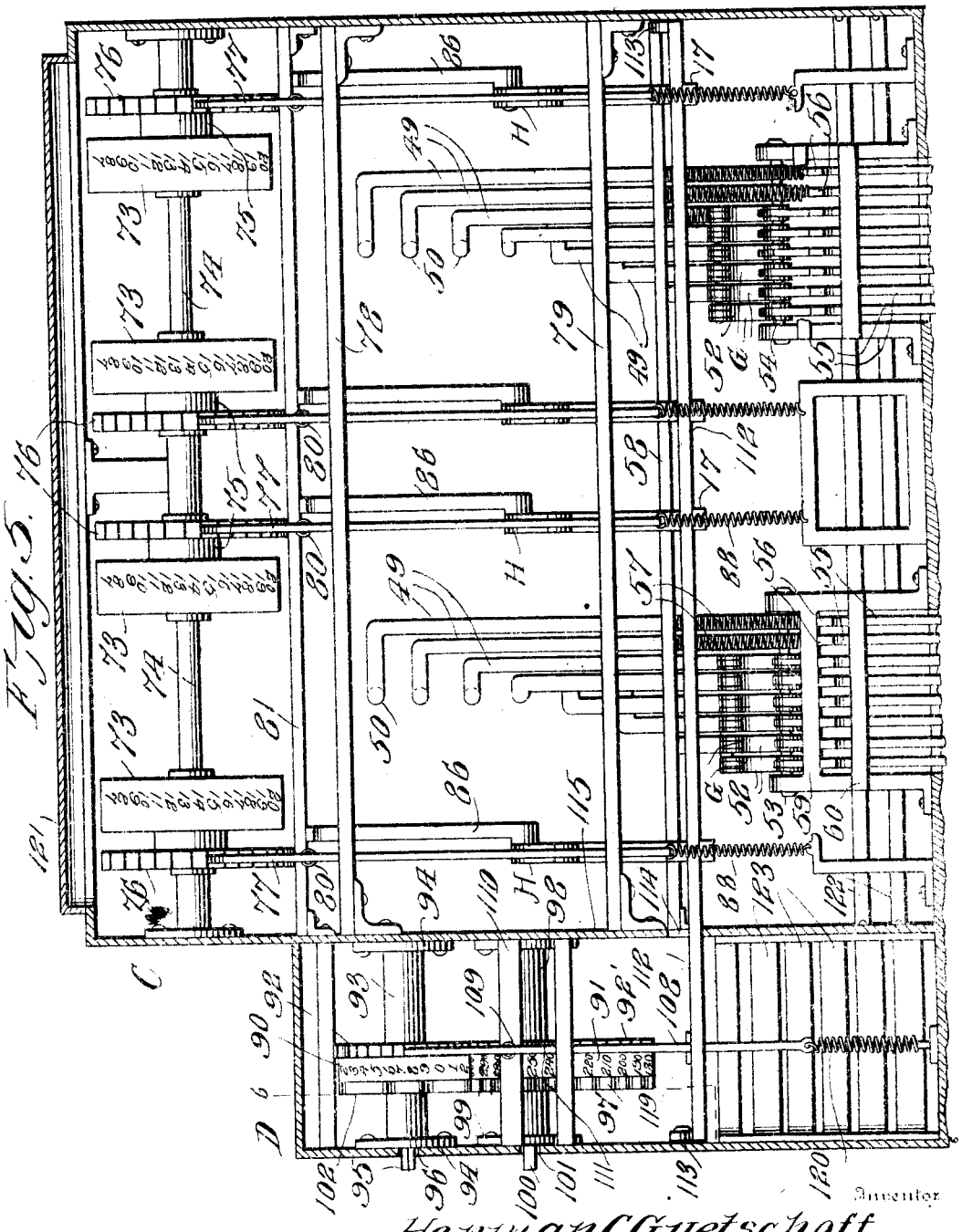
Figure 6:
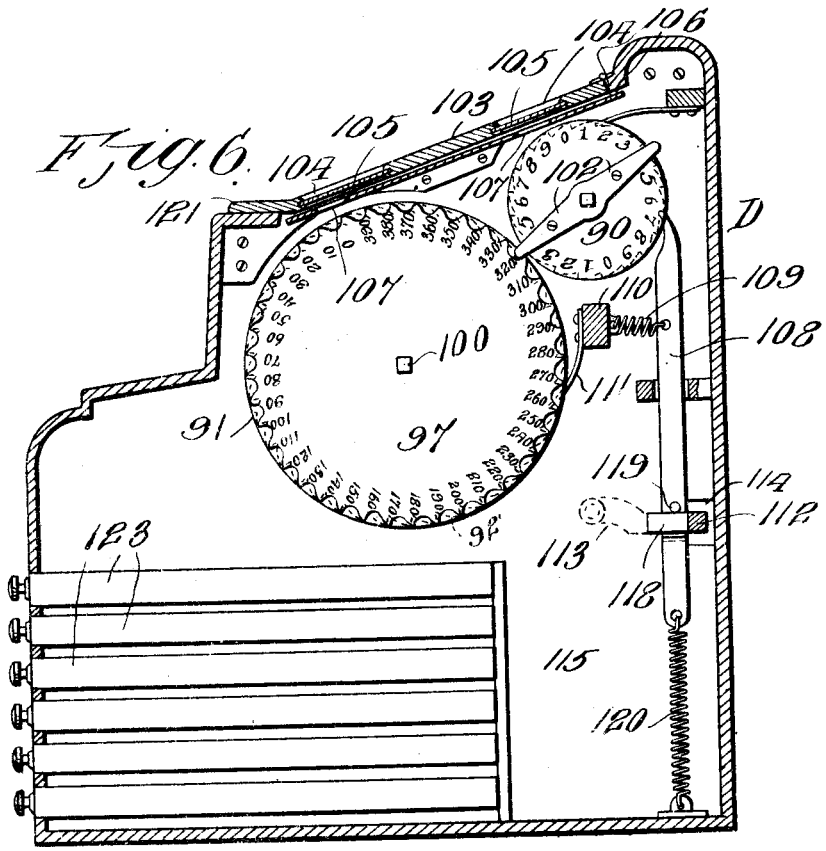
Figure 7:
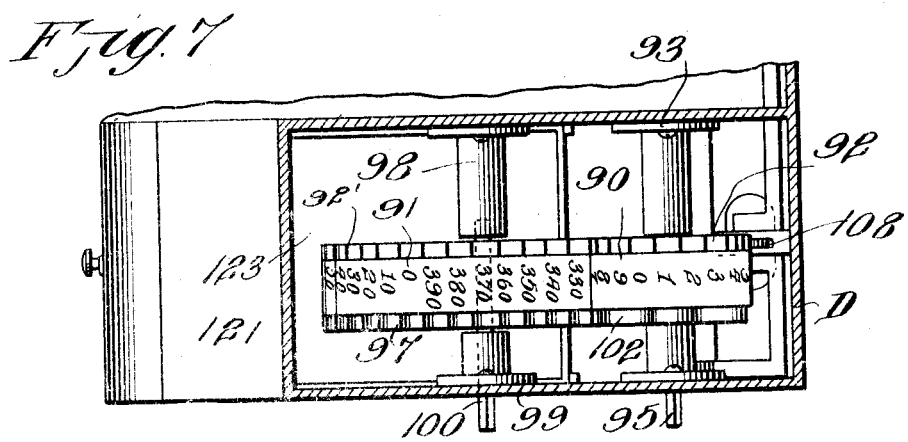

In the drawings:—Figure 1 is a perspective view, showing an account register constructed in accordance with the invention. Fig. 2 is a sectional end elevation. Fig. 3 is a horizontal sectional view taken through the filing compartment. Fig. 4 is a vertical longitudinal sectional view taken through the filing compartment and the base of the register. Fig. 5 is a vertical longitudinal sectional view taken through the top compartment containing the registering disks. Fig. 6 is a sectional view taken on the plane indicated by the line 6—6 in Fig. 5. Fig. 7 is a detailed top plan view of the parts illustrated in Fig. 6. Fig. 8 is a perspective detail view of one of the removable casings. Fig. 9 is a perspective detail view of one of the tray receptacles. Fig. 10 is a perspective detail view of one of the trays. Fig. 11 is a longitudinal vertical sectional view of one of the trays. Fig. 12 is a transverse sectional view of the same.

Corresponding parts in the several figures are denoted by like characters of reference.

The improved device comprises a casing or cabinet which is suitably constructed to include a base A, a filing case B, and registering compartments C and D.

The base A contains drawers 20 which may be utilized as cash drawers or for other purposes.

The portion of the cabinet which constitutes the filing case is sub-divided into a plurality of compartments each accommodating a rectangular casing 22 having a handle 23 and containing a plurality of tray receptacles E which are slidably arranged, like drawers in said casings, each of said tray receptacles being equipped with a base plate 24 the side edges of which constitute tongues 25 that are fitted to slidably engage grooves 26 in the side walls of the casings. The tray receptacles E are preferably constructed of sheet metal, each comprising a bottom plate or member 27 which is mounted upon the base 24, a plurality of vertical walls or partitions 28, and a plurality of horizontal partitions 29 having down-turned flanges 30 for the passage of fastening members such as rivets 31 whereby they are secured upon the vertical walls or partitions. Each of the tray receptacles E is thus sub-divided into a plurality of minor compartments or spaces 32 for the reception of individual trays or boxes F wherein the sales slips or accounts of individual customers are stored for safe keeping and for ready reference.

Each of the trays or boxes consists of a shallow elongated box of approximately rectangular form, the same being of a size and shape to conveniently accommodate sales or account slips of usual size. In its preferred construction the box or tray F is provided with an upwardly and rearwardly inclined front wall 33 adjacent to the lower edge of which is secured a finger piece 34; the side walls 35 are approximately vertical and said side walls are connected adjacent to the rear wall 36 by a cap piece 37 with which the lid 38 is hingedly connected, said lid being provided at its front edge with a tongue 39 adapted to engage a notch 40 in the upper edge of the front wall, thus forming a projection or handle whereby the lid may be readily swung open. The side edges of the lid are provided with down-turned flanges 41 forming grooves wherein a record slip of card board or other suitable material may be conveniently kept in such a manner as to be conveniently renewable when necessary. It is to be noted that the casings 22 in which the tray receptacles are fitted, are to be open at their rear ends while the tray receptacles E are equipped with back walls 42; the front ends of said tray receptacles being open so as to make the trays or boxes conveniently accessible.

Each of the tray receptacles is provided adjacent to its side walls with rearwardly extending arms 43 that are slidably fitted in longitudinally grooved brackets 44, the latter being firmly secured upon the frame or casing of the machine. The brackets 44 are equipped at their forward ends with cross pieces 45 which are connected by traction springs 46 with upstanding lugs 47 adjacent to the rear ends of the slides 43, said springs serving to impel the tray receptacles E in a forward direction. For the purpose of keeping the receptacles at the rearward limits of their movements when pushed back against the tension of the springs, the rear walls of said receptacles are provided with keepers 48 adapted to be engaged by locking levers, the construction arrangement and operation of which I shall now proceed to describe.

The device is equipped with a plurality of keys 49 arranged to slide in slots 50 in the curved front wall 51 of the frame or casing of the machine. Each key 49 is pivotally connected at its inner end with one arm 52 of a bell crank G which is supported for oscillation upon a suitably supported shaft 53; the other arm 54 of each bell crank being pivotally connected with the upper end of a tracker 55 consisting of a slide which is suitably supported for vertical movement and which has a rearward extending arm 56 connected by a retracting spring 57 with a cross head 58. Cross bars 59 and 60 which are suitably supported in the frame or casing of the machine respectively above and below the arms 56 of the trackers serve to limit the movements of said trackers upwardly as well as downwardly. The springs 57 incidentally serve to restore the keys 49 to normal or initial position when released from pressure for the purpose of actuating the bell cranks and the parts associated therewith.

Uprights 61 which perform the additional function of braces in the frame structure of the machine are provided with arms or brackets 62 having uprights or posts 63 upon which the latch levers 64 are pivotally supported. Each of the latch levers 64 is beveled at its front end as shown at 65 and provided with a notch 66 adapted for engagement with the keeper 44 upon the back wall of one of the tray receptacles E, a retracting spring 67 serving to keep the lever 64 in locked engagement with the keeper; each of the levers 64 is provided adjacent to its rear end with a laterally extending pin 68 operating in a slot 69 in one of the trackers 55.

It will be observed that the trackers 55 are made of different lengths and that the parts of the mechanism are otherwise proportioned and arranged to properly coöperate with the tray receptacles which latter are disposed in vertical series as shown and described; each of the tray receptacles E being associated with a particular key 49 which latter are provided at their forward ends which project through the casing wall 51 with duplicate finger pieces or buttons 70, which may be inscribed with letters or numerals or both, or with characters of any description whereby they may be associated with the respective tray receptacles and with the persons that are expected to operate the particular compartments.

When pressure in a downward or inward direction is exerted upon one of the keys, it will rock the bell crank G and move in a downward direction against the tension of the spring 57, the tracker 55 associated with such key and bell crank. Initially, the pins 68 of the levers 64 are disposed adjacent to the upper ends of the slots 69 in the trackers; hence, when a tracker is depressed it will rock the lever 64 associated therewith against the tension of the spring 67 to disengage the notch 66 from the keeper 48, thus releasing the tray receptacle E and causing the latter to be forced in a forward direction by the action of the springs 46. As soon as pressure upon the key 49 is released, said key will rebound by the action of the spring 57 as aforesaid, and the tracker will be restored, also by the action of said spring, to its initial position. Now, when the tray receptacle is pushed back against the tension of the spring 46, the keeper 48 will strike the beveled front end of the lever 64, rocking the latter against the tension of the spring 67 and causing the notch 66 to engage the keeper, thus locking the tray receptacle and holding it securely in its retracted position. The locking movement of the lever 64 is made possible by the presence of the slot 69 in the tracker which permits a limited downward movement of the pin 68.

For the purpose of limiting the movement of the tray receptacles E in a forward direction, suitable stops may be provided; a simple form of such stops consisting in mutilating the projecting side edges or tongues 25 of the base plates 24, of said receptacles to form shoulders 71 adapted to engage or impinge upon inturned flanges 72 at the front edges of the side walls of the casings 22.

The upper part of the top compartment C of the cabinet casing is equipped with roller indicators 73 which are supported for rotation upon a shaft 74; each of said indicators consisting of a cylinder having a hub 75 whereby it is operatively connected with a ratchet wheel 76, and each of said indicators being provided with numbers inscribed upon the side wall thereof in successive order from one upward and corresponding in number with the number of teeth upon the ratchet wheels 76; in the drawings each indicator is provided with numbers from one to twenty-five inclusive and each ratchet wheel with twenty-five teeth, but it is obvious that the number may be varied at will. Each of the spur wheels is engaged and actuated by a pawl 77 which is guided for vertically sliding and vibratory movement in suitably supported keepers 78 and 79, and each pawl being held in constant engagement with the ratchet wheel by the action of a retracting spring 80 one end of which is connected with the pawl and the other end with a suitably supported cross bar 81 which latter also supports springs 82 one for each ratchet wheel 76, which by the action of such spring is held against reverse movement.

In the drawings hereto annexed four roller indicators have been shown, each having actuating mechanism associated therewith and it is to be understood that each of said indicators is to be associated with certain predetermined tray receptacles. The machine is provided with special keys 83, one for each indicator, said keys being guided through slots in the curved front wall of the frame or casing of the machine and provided at its front end with a finger piece 84 which may be inscribed with an initial or other character whereby it is to be associated with the person who is assigned to manipulate such key; the inner end of each of the keys 83 is pivotally connected with one arm 85 of a bell crank H fulcrumed upon a supporting arm or bracket 86 and the other arm of which 87 is pivotally connected with one of the pawls 77. Each pawl 77 is forced in a downward direction by means of a suitably disposed spring 88 the downward movement of the pawl being accurately gaged and limited by an adjustable stop which may consist of a set screw 89 lying in the path of the arm 87 of the bell crank, said set screw being mounted for vertical adjustment in the keeper 79.

The compartment D of the casing or frame structure, which is located above the filing compartment B and adjacent to the compartment C contains mechanism for indicating the total number of sales or credit transactions during a predetermined period, such as one business day. Said mechanism includes a units wheel or roller 90 and a tens wheel or roller 91. Upon the periphery of the units wheel are inscribed the digits from 0 to 9 in successive order and upon the periphery of the tens wheel any desired number of multiples of ten are inscribed in successive order, beginning, however, with 0. For convenience in arranging the proportions of the parts, any desired multiple of series of digits may be inscribed upon the units wheel, and in the drawings hereto annexed, the units wheel has been shown provided with two such series making twenty in all to correspond with the number of teeth upon a ratchet wheel 92 which is suitably connected with the units wheel, being mounted upon the shaft 93 which carries said units wheel and which is supported for rotation in bearings 94; the shafts 93 being provided with a key post 95 that projects through an aperture 96 in the side wall of the casing, thus enabling the shaft 93 to be rotated by means of an ordinary key. The tens wheel has been shown as having numbers inscribed upon its periphery from zero to three hundred and ninety, the numbers above 10 being multiples of ten as before described, and a spur wheel 97 having forty notches is suitably connected with said tens wheel 91 being mounted upon the shaft 98 carrying the latter and which is supported for rotation in bearings 99; said shaft being provided with a key post 100 extending through an aperture 101 in the side wall of the casing. The units wheel 90 is equipped with radial arms 102 adapted to engage the spur wheel 97, one such arm being provided for each series of ten digits, and two such arms being accordingly shown in the drawings; hence, by each rotation of the units wheel, the tens wheel will be moved to the extent of two spaces or notches of the spur wheel. The top compartment D is provided with a hinged lid 103 having side openings 104 which may be protected by pieces of glass or other transparent material 105 and through which the registering wheels may be observed; a plate or diaphragm 106 which is supported within the casing is equipped with slots or apertures 107 permitting only one number space of each of the wheels 90 and 91 to be observed at one time. The parts are obviously so arranged with relation to each other that the tens wheel will be actuated to the extent of one notch each time that the exposed space of the units wheel moves from 9 to zero; thus assuming the zero space of the tens wheel to be exposed through the sight opening and the "9" space of the units wheel, the next movement of the units wheel will cause a movement of the tens wheel sufficient to expose the number "10", while the units wheel moves to zero, thus indicating ten transactions.

For the purpose of actuating the units wheel, a vertically slidably pawl 108 is provided, said pawl being held in engagement with the ratchet wheel 92 by a spring 109 connecting said pawl with a suitably supported cross bar 110 which also carries a spring 111 that engages a ratchet wheel 92' connected with the tens wheel for the purpose of preventing the reverse movement of the indicating mechanism. A cross bar 112 that extends through the entire casing of the machine is terminally supported upon cranks 113 that are pivoted upon the ends walls of the frame or casing; said bar 112 extending through a slot or aperture 114 in the partition wall 115 which separates the compartment D from the compartment C. The arm 87 of each of the bell cranks H within the compartment C is provided with a depending arm 116 having an offset 117 that extends beneath the cross bar 112 which latter will thus be bodily displaced in an upward direction by each operation of any one of the bell cranks H, the downward movement of the bell crank arm 87 permitting the cross bar 112 to drop by gravity to its initial position. The cross bar 112 is provided within the compartment D with an arm 118 lying adjacent to the pawl 108 which latter is equipped with a pin 119 lying in the path of said arm; hence, when the cross bar 112 is displaced upwardly, the arm 118 will displace the pawl 108 in an upward direction against the tension of a retracting spring 120, the extent of the movement of the pawl 108 being sufficient to move the units wheel 90 to the extent of one space or notch.

The top of the compartment C of the casing is provided with a movably supported lid 121 affording access to the interior, and thus permitting the indicating rollers 73 to be adjusted by proper manipulation. The base of the compartment C is provided with slides 122 upon which index cards having the names of customers arranged in alphabetic order may be inscribed in such a manner as to be very conveniently accessible for consultation. Drawers 123 are also arranged in the base of the compartment D.

In the practical use of this invention, it is intended to assign to each credit customer a tray in one of the receptacles, said tray being preferably designated by a number, and a corresponding number being assigned or placed opposite to the name of the customer upon the index slide together with the letter or number of the receptacle containing the particular tray. One of the keys 83 having a finger piece 84 is assigned to each clerk individually or, if preferred, to each crew of salesmen. When a credit sale is made, the clerk or salesman after ascertaining the number of the receptacle in which the tray assigned to the customer is kept, presses the corresponding key, thus releasing the receptacle which is automatically projected by the action of the springs 46, thus exposing the trays in a conveniently accessible position; at the same time the clerk or salesman presses his individual key, thus moving the indicating roller 73 associated with such key the space of one notch and at the same time actuating the registering mechanism in the compartment D. The front of the compartment C is provided with sight openings 124 through which one number space of each of the rollers 73 is visible, thus enabling the number of transactions by each clerk or salesman to be ascertained, while the registering mechanism in the compartment D will obviously indicate the total or aggregate number of sales or transactions. As hereinbefore stated, each credit transaction is recorded upon two sales slips one of which may be given to the customer while the other or duplicate is filed for reference in the tray assigned to the customer; at the same time the total amount of the sale or transaction is entered upon a record slip or card which is secured in the flanges 42 upon the lid of the tray; the record being thus kept absolutely up to date, and enabling the indebtedness of any customer to be ascertained by simple addition of the amounts upon the record slip or card.

It will thus be seen that by this invention much complicated and involved bookkeeping may be dispensed with a perfect record being preserved of each credit transaction and every detail thereof. The individual standing of one customer may be quickly and readily ascertained. In addition to this a record is kept of the number of credit sales or transactions made by each clerk during each business day or other predetermined period, as well as of the total number of sales or credit transactions during such period. It is obvious that the indicating mechanism may be enlarged to provide for a record of any desired number of transactions within the capacity of the machine.

It is also obvious that the filing capacity of the device, the number of trays and tray receptacles and other details may be varied at will.

The construction of the improved device is simple and convenient; it being, of course, understood that at the beginning of each business day or other predetermined period, the entire registering mechanism is to be adjusted to zero, in order that an accurate and dependable record may be kept.

Having thus described the invention, what is claimed as new, is:—

1. In a device of the character described, a filing cabinet having slidably supported spring projected receptacles, keepers upon the rear walls of the receptacles, spring actuated latch levers engaging the keepers and provided with laterally extending pins, vertically slidable and slightly vibratory spring actuated trackers having slots engaging the laterally extending pins, bell cranks supported adjacent to the trackers and having arms pivotally connected therewith, and slidably supported keys terminally connected with the other arms of the bell cranks.

2. In a device of the character described, a slidably supported spring projected receptacle, a keeper upon the rear wall thereof, a spring actuated latch lever engaging the keeper and having a laterally extending pin, a vertically movable and slightly vibratory tracker having a slot engaging the laterally extending pin and provided with a laterally extending arm, an actuating spring connected with said arm, stop members lying in the path of the laterally extending arm at opposite sides thereof, a bell crank having a rearward extending arm pivotally connected with the tracker and an upwardly extending arm, and a slidably supported key pivotally connected with the upwardly extending arm of the bell crank.

In testimony whereof I affix my signature in presence of two witnesses.

HERMAN C. GUETSCHOFF.

Witnesses:
OSCAR BORN.
GEORGE W. STEVENS.